US010628142B2

(12) United States Patent
Villarreal, Jr.

(10) Patent No.: US 10,628,142 B2
(45) Date of Patent: Apr. 21, 2020

(54) LOOP BREAK

(71) Applicant: TEXAS INSTRUMENTS INCORPORATED, Dallas, TX (US)

(72) Inventor: Jesse Gregory Villarreal, Jr., Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/655,356

(22) Filed: Jul. 20, 2017

(65) Prior Publication Data

US 2019/0026089 A1 Jan. 24, 2019

(51) Int. Cl.
*G06F 8/41* (2018.01)

(52) U.S. Cl.
CPC ............ *G06F 8/4452* (2013.01); *G06F 8/427* (2013.01)

(58) Field of Classification Search
CPC ............................... G06F 8/427; G06F 8/4452
USPC ......................................................... 717/160
See application file for complete search history.

(56) References Cited

U.S. PATENT DOCUMENTS

| | | | | |
|---|---|---|---|---|
| 5,475,842 A | * | 12/1995 | Gilbert ..................... | G06F 8/453 717/160 |
| 5,797,013 A | * | 8/1998 | Mahadevan ............ | G06F 8/443 717/160 |
| 5,958,048 A | | 9/1999 | Babaian et al. | |
| 6,016,399 A | * | 1/2000 | Chang ................... | G06F 8/4452 717/160 |
| 6,192,515 B1 | * | 2/2001 | Doshi ................... | G06F 8/4452 717/161 |
| 6,539,541 B1 | * | 3/2003 | Geva ....................... | G06F 8/443 717/160 |
| 6,571,385 B1 | * | 5/2003 | Muthukumar ........ | G06F 8/4452 717/150 |
| 6,820,250 B2 | | 11/2004 | Muthukumar et al. | |
| 7,624,387 B2 | | 11/2009 | Yoshida et al. | |
| 8,104,030 B2 | * | 1/2012 | Silvera .................. | G06F 8/4452 717/127 |
| 8,191,057 B2 | * | 5/2012 | Archambault ........ | G06F 8/4441 717/161 |

(Continued)

FOREIGN PATENT DOCUMENTS

| | | | |
|---|---|---|---|
| JP | 6018022 B2 * | 11/2016 | ............. G06F 8/452 |
| WO | 199806038 A1 | 2/1998 | |

(Continued)

OTHER PUBLICATIONS

Muthukumar et al., "Software Pipelining of Loops with Early Exits for the Itanium™ Architecture", www.researchgate.net, 2001.*
Bhowmik et al.,"A General Compiler Framework for Speculative Multithreading", Aug. 2002, ACM (Year: 2002).*
Larsen et al., "Exploiting Vector Parallelism in Software Pipelined Loops", 2005, IEEE (Year: 2005).*

(Continued)

*Primary Examiner* — Wei Y Zhen
*Assistant Examiner* — Junchun Wu
(74) *Attorney, Agent, or Firm* — Eddy Abraham; Charles A. Brill; Frank D. Cimino

(57) ABSTRACT

In the described examples, a non-transitory machine-readable medium includes a compiler that detects a soft-break indicator in a loop included in source code and the compiler applies software pipelining to generate compiled code for the loop. The compiled code includes assembly instructions and the soft-break indicator enables the compiler to arrange the assembly instructions to complete in-flight iterations of the loop after execution of the soft-break.

20 Claims, 2 Drawing Sheets

(56) References Cited

U.S. PATENT DOCUMENTS

| | | | |
|---|---|---|---|
| 9,075,945 B1* | 7/2015 | Ventelae | G06F 17/5054 |
| 2003/0233643 A1* | 12/2003 | Thompson | G06F 8/4452 |
| | | | 717/161 |
| 2007/0006188 A1* | 1/2007 | Schroth | G06F 8/447 |
| | | | 717/162 |
| 2009/0064119 A1* | 3/2009 | Archambault | G06F 8/4441 |
| | | | 717/160 |
| 2010/0325608 A1* | 12/2010 | Radigan | G06F 8/456 |
| | | | 717/156 |
| 2011/0047534 A1* | 2/2011 | Ye | G06F 8/443 |
| | | | 717/160 |
| 2012/0144376 A1* | 6/2012 | Van Eijndhoven | G06F 8/456 |
| | | | 717/146 |
| 2012/0185714 A1* | 7/2012 | Chung | G06F 1/3203 |
| | | | 713/323 |
| 2012/0254888 A1* | 10/2012 | Kalogeropulos | G06F 8/452 |
| | | | 718/107 |
| 2014/0298306 A1 | 10/2014 | Rong et al. | |
| 2014/0359591 A1* | 12/2014 | Park | G06F 8/4452 |
| | | | 717/151 |
| 2017/0123795 A1* | 5/2017 | Chen | G06F 15/7867 |

FOREIGN PATENT DOCUMENTS

| | | |
|---|---|---|
| WO | 200213004 A2 | 2/2002 |
| WO | 2016032495 A1 | 3/2016 |

OTHER PUBLICATIONS

Hsu et al., "Improving Region Selection Through Early-Exit Detection", Apr. 2012, Institute of Information Science, Academia Sinica, Taipei, Taiwan (Year: 2012).*

Triantafyllis et al., "Compiler Optimization-Space Exploration", 2003, IEEE (Year: 2003).*

Tirumalai et al., "Parallelization of Loops with Exits on Pipelined Architectures", Nov. 1990, SuperComputing' 90 (Year: 1990).*

Muthukumar et al., "Software Pipelining of Loops with Early Exits for the Itanium™ Architecture", 2001, Intel (Year: 2001).*

Ruttenberg, John, et al., "Software Pipelining Showdown: Optimal vs. Heuristic Methods in a Production Compiler", Publication, May 1, 1996, 11 pgs.

* cited by examiner

```
for ( j = (int32_t)i+1; j < num_corners_in; j++ ) {
    A(corners_in[j]);
    B(corners_in[j]);
    C(corners_in[j]);
    /* Exit early if we are beyond the min_distance, vertically */
    if( fabsf(dy) > min_distance ) {
        soft_break(); //soft-break indicator
    }
    else {
        D(corners_in[j]);
        E(corners_in[j]);
    }
}
```

FIG. 3 — 150, 152

```
for ( j = (int32_t)i+1; j < num_corners_in; j++ ) {
    A(corners_in[j]);
    B(corners_in[j]);
    C(corners_in[j]);
    /* Exit early if we are beyond the min_distance, vertically */
    if( fabsf(dy) > min_distance ) {
        #pragma SOFT_BREAK
        break;
    }
    else {
        D(corners_in[j]);
        E(corners_in[j]);
    }
}
```

FIG. 4 — 160, 162

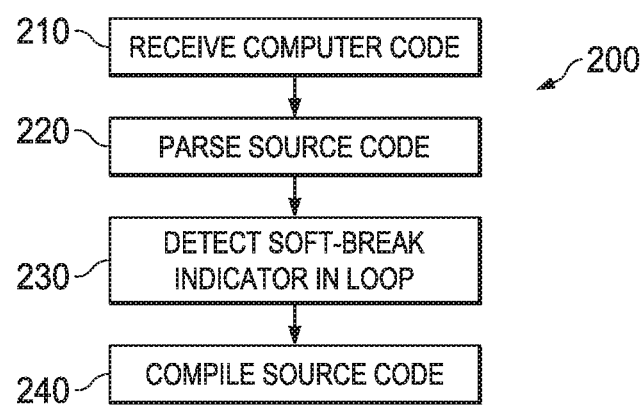

FIG. 5

LOOP BREAK

TECHNICAL FIELD

This disclosure relates generally to a compiler that applies software pipelining for breaking out of a loop in source code.

BACKGROUND

In computer science, a loop is a sequence of statements which is specified once but which can be carried out several times in succession. Source code "inside" (or embedded in) the loop (the body of the loop) is executed a specified number of times, once for each of a collection of items, until some condition is met (or indefinitely where the condition is never stratified). In most computer programming languages, a while-loop (also known as a while loop) is a control flow statement that allows code to be executed repeatedly based on a given Boolean condition. The while-loop can be thought of as a repeating if statement. A for-loop (or simply a for loop) is a control flow statement for specifying iteration, which allows code to be executed repeatedly. Unlike other kinds of loops, such as the while-loop, the for-loop is often distinguished by an explicit loop counter or loop variable. This allows the body of the for-loop (the code that is being repeatedly executed) to know about the sequencing of each iteration. For-loops are also typically employed when the number of iterations is known before entering the loop. For-loops are a shorthand way to make loops when the number of iterations is known, as nearly every for-loop could alternatively be written as a while-loop. Another type of loop, known as a do-while-loop (or simply a do while loop) is a while-loop that executes a block of code (the body of the do-while-loop) at least once and then repeatedly executes the block, or not depending on a Boolean condition at the end of the block.

A compiler directive, also known as a directive pragma (from "pragmatic") is a language construct that specifies how a compiler should process input. Compiler directives are not part of the grammar of a programming language, and may vary from compiler to compiler. In at least one example, a compiler directive is processed by a preprocessor to specify compiler behavior, or function as a form of in-band parameterization. In some examples, compiler directives specify global behavior, while in other cases a directive only affects a local section, such as a block of programming code. In some examples, compiler directives are optional compiler hints, and may be ignored. In other examples, a compiler directive is prescriptive, and must be followed by the compiler. However, a compiler directive does not perform any action in the source code itself, but rather changes a behavior of the compiler.

SUMMARY

In a first example, a non-transitory machine-readable medium includes a compiler that detects a soft-break indicator in a loop included in source code and the compiler applies software pipelining to generate compiled code for the loop. The compiled code includes assembly instructions and the soft-break indicator enables the compiler to arrange the assembly instructions to complete in-flight iterations of the loop after execution of the soft-break.

In a second example, a system includes a non-transitory machine-readable memory that stores machine-readable instructions and a processing unit including one or more processor cores that accesses the memory and executes the machine-readable instructions. The machine-readable instructions include a compiler that includes a front end that receives source code comprising a loop with an embedded soft-break indicator. The front end generates an intermediate representation (IR) of the source code that includes the soft-break indicator. The compiler also includes a back end that generates machine executable instructions based on the IR, wherein a subset of the machine executable instructions corresponding to the loop implements software pipelining.

In a third example a method includes receiving source code with a loop that has a soft-break indicator in a body of the loop. The method also includes detecting the soft-break indicator and compiling the source code to form compiled code. A set of machine executable instructions in the compiled code that corresponds to the loop includes instructions for executing an in-flight iteration of the loop after exiting the loop.

BRIEF DESCRIPTION OF THE DRAWINGS

FIG. 3 is an example of source code with a loop having an embedded soft-break indicator.

FIG. 4 is another example of source code with a loop having an embedded soft-break indicator.

FIG. 5 is a flowchart of an example method for compiling source code.

DETAILED DESCRIPTION

Example systems and methods for compiling source code are described. In particular, during compilation of the source code a compiler is programmed/configured to detect a soft-break indicator in a loop of the source code. In at least one example, the soft-break indicator is a compiler hint. In at least one other example, the soft-break indicator is an intrinsic function of the compiler that is called from the source code. As used herein, the term "soft-break" denotes an early exit from a loop that does not require immediate termination of operations related to the loop.

In particular, to implement the soft-break, the compiler is permitted to complete iterations of the loop that are already in-flight. In this manner, the compiler implements software pipelining for compiled code corresponding to the loop, even though the loop includes a break (an early exit), namely the soft-break. Accordingly, in certain forms of source code, the resultant compiled code improves the execution time, thereby improving the performance of a computing device executing the compiled code.

Figure 1:
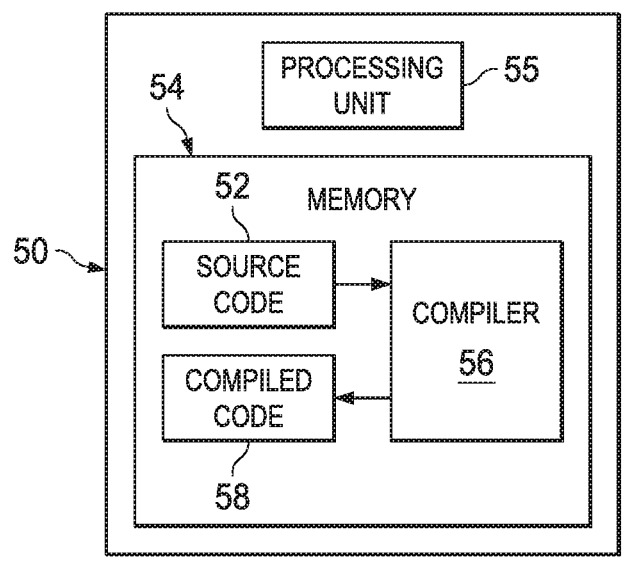
FIG. 1 is a block diagram of an example of a computing device for compiling source code.

FIG. 1 illustrates a block diagram of a computing device 50 for compiling source code 52. In at least one example, the computing device 50 is a general purpose computer. In other examples, the computing device 50 is a programmed/configured machine that executes a specific task or set of tasks. The computing device 50 includes a memory 54 for storing data and machine-readable instructions, including the source code 52. The computing device 50 also includes a processing unit 55 that accesses the memory 54 and executes the machine-readable instructions.

The memory 54 is a non-transitory machine-readable medium. In some examples, the memory 54 implemented as volatile memory (e.g., random access memory), non-volatile memory (e.g., a hard disk drive, a solid state drive, flash memory or the like) or a combination thereof. The processing unit 54 is implemented as one or more processor cores of a given type (e.g., x86, ARM, digital signal processor (DSP) or the like).

The memory 54 includes a compiler 56 that receives the source code 52. The source code 52 represents text of a high level computer language (e.g., human readable computer instructions), such as but not limited to C, C++, C sharp (C #), Objective-C, Swift, Java, JavaScript, Perl, Python or the like.

The compiler 56 is configured/programmed to support software pipelining. Software pipelining is a technique employed to adjust/hone loops in source code in a manner that parallels hardware pipelining. Software pipelining is a type of out-of-order execution, except that the reordering is executed by the compiler 56 rather than the processing unit 55.

The compiler 56 parses the source code 52 to determine a structure of the source code and/or to detect errors in the source code. The compiler 56 detects a soft-break indicator in a loop of the source code 52. In at least one example, the loop is a while-loop. In at least one other example, the loop is a for-loop. In still another example, the loop could be a do-while-loop. In each example, the soft-break is embedded in a body of the loop, and is implemented as a request for an early exit of the loop. However, since the compiler 56 supports software pipelining, multiple iterations of the code may be executed concurrently, which executing iterations are referred to as "in-flight iterations".

In at least one example, the soft-break indicator is a compiler directive, such as a compiler hint. In at least one other example, the soft-break is an intrinsic function of the compiler. As used herein, the term "soft-break" denotes a compiler instruction (through a compiler directive or an intrinsic function) that enables (but does not require) the compiler 56 to apply software pipelining to the loop, and enables the compiler to complete the in-flight iterations of software code in the loop after execution of a break from the loop in a given iteration. The compiler 56 compiles the source code to generate compiled code 58 formed of machine-readable instructions (e.g., assembly code instructions). In at least one example, the compiler 56 employs software pipelining for a subset of the machine executable instructions to execute operations of the loop.

In contrast to a soft-break, a hard break (non-soft break), may prevent the compiler 56 from employing software pipelining. In particular, the compiler 56 tracks a condition referred to as "loop-carried dependencies", which dictate a maximum allowed loop iteration overlap. By enabling in-flight iterations to continue, the soft-break functions to remove the loop-carried dependency that the (non-soft) break statement would otherwise create. Accordingly, the removal of the loop-carried dependencies increases an allowed (permitted) amount of overlap between successive iterations of the loop.

By employment of the soft-break indicator in the source code 52, the compiler 56 may apply software pipelining to a loop with a break (an early exit), namely the soft-break. In this manner, computer resources of the computing device 50 are apportioned more efficiently than a program with a hard-break (a non-soft break in an existing compiler) from a loop that prevents software pipelining in at least some situations. Accordingly, the compiler 56 improves the performance of a computing device executing the compiled code 58 (including, but not limited to the computing device 50).

Figure 2:
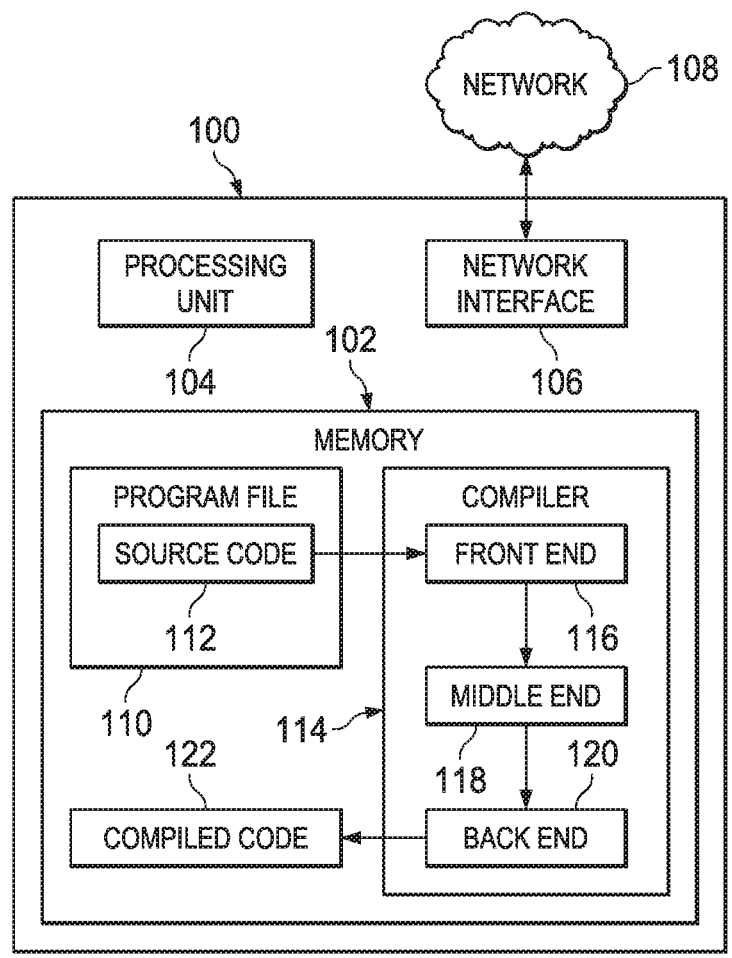
FIG. 2 is a block diagram of another example of a computing device for compiling source code.

FIG. 2 illustrates an example of a computing device 100 for compiling source code. In at least one example, the computing device 100 is a general purpose computer. In at least one other example, the computing device 100 is configured/programmed to execute a specific set of tasks, such as an application specific integrated circuit (ASIC) chip. In yet another example, the computing device 100 is representative of a microcontroller with embedded instructions. The computing device 100 includes a memory 102 for storing data and machined executable instructions. The memory 102 is a non-transitory machine-readable medium. In at least one example, the memory 102 is implemented as non-volatile memory (e.g., a solid state drive, a hard disk drive, flash memory or the like), volatile memory (e.g., random access memory) or a combination thereof.

The computing device 100 includes a processing unit 104 that accesses the memory 102 and executes the machine-readable instructions. The processing unit 104 includes one or more processor cores of a given type. As one example, the processing unit 104 is an x86 32 bit or 64 bit processing unit. As other examples, the processing unit 104 is an ARM processing unit or a digital signal processor (DSP), such as a C6X DSP. In fact, the processing unit 104 could be nearly any type of processing architecture.

In at least one example, the computing device 100 includes a network interface 106 for communicating on a network 108. In at least one example, the network interface 106 is implemented as a network interface card (NIC). In some examples, the network 108 is implemented as a public network (e.g., the Internet), a private network (e.g., a local area network (LAN)) or a combination thereof, such as a virtual private network (VPN).

In at least one example, the computing device 100 is implemented in a computing cloud. In such a situation, features of the computing device 100, such as the processing unit 104, the network interface 106, and the memory 102 are representative of a single instance of hardware or multiple instances of hardware with applications executing across the multiple of instances (i.e., distributed) of hardware (e.g., computers, routers, memory, processors, or a combination thereof). Alternatively, the computing device 100 is implemented on a single computing device.

The memory 102 includes a program file 110 that has source code 112 embedded therein. In at least one example, the program file 110 is provided from an external source (e.g., another computing device) via the network 108. In other examples, the program file 110 may be generated locally on the computing device (e.g., at a graphical user interface).

In at least one example, the source code 112 is text that represents computer instructions written in a given high level (human-readable) computer language, such as, but not limited to C, C++, C sharp (C #), Objective-C, Swift, Java, JavaScript, Perl, Python or the like. In some examples, the source code 112 is a full software application (App). In other examples, the source code 112 is a portion of an application or a library file that (upon compilation) is employable by as object code (e.g., in an object file) by another software application.

The memory 102 also includes a compiler 114. The compiler 114 converts the source code 112 into machine-readable instructions (e.g., assembly code). The compiler 114 is programmed/configured to compile the source code 112 in the given high level computer language. The compiler 114 supports software pipelining. As noted, software pipelining is a technique employed to hone/adjust loops in source code in a manner that parallels hardware pipelining.

Software pipelining enables out-of-order execution, wherein the reordering is selected by the compiler 114.

The source code 112 includes a loop with a soft-break indicator embedded in a body of the loop. In at least one example, the loop is a for-loop. In at least one other example, the loop is a while-loop. Additionally, it is understood that in other examples, the loop could be another type of loop, such as a do-while-loop. FIG. 3 illustrates an example of source code 150 that includes a for-loop with a soft break indicator 152 embedded in a body of the loop that is an intrinsic (built-in) function of the compiler. FIG. 4 illustrates an example of source code 160 that includes soft-break indicator 162 implemented as a compiler hint (e.g., a compiler directive), labeled in FIG. 4 as with a keyword indicating a compiler directive ("# pragma") and a descriptor of the compiler directive ("SOFT_BREAK") and a break function, labeled in FIG. 4 as "break( )".

Referring back to FIG. 2, the compiler 114 receives the program file 110 at a front end 116 of the compiler 114. The front end 116 verifies syntax and semantics of the source code 112 according to the given high-level computer language (source code) that the compiler is programmed/configured to transform to a target language (object code). The front end 116 executes type-checking by collecting type information and generates errors and warnings for the source code 112. The front end 116 can execute lexical analysis, syntax analysis, and semantic analysis for the source code 112. The front end 116 of the compiler 114 analyzes the source code 112 to build an internal representation of the program, which may be referred to as an intermediate representation or IR. The IR is a lower level of representation of the program with respect to the source code 112. The front end 116 also manages a symbol table, a data structure mapping each symbol in the source code 112 to associated information such as location, type and scope. The front end 116 identifies/detects the soft-break indicator in the loop of the source code 112. In this manner, the IR generated by the front-end 116 includes data specifying the soft-break indicator.

The IR is passed to a middle end 118 of the compiler 114. The middle end 118 executes machine independent adjustments (e.g., optimizations). In some examples, such adjustments includes removal of useless (dead code elimination) or unreachable code (reachability analysis), detection and propagation of constant values (constant propagation), relocation of computation to a less frequently executed place (e.g., out of a loop) or specialization of computation based on the context. The middle end 118 generates an adjusted IR that is passed to a back end 120. Additionally, in some examples, the middle end 118 is omitted or makes no adjustments to the IR, such that the back end 120 receives the IR.

In at least one example, the back end 120 executes additional analysis, transformations and adjustments (optimizations) that are for the given type of the processing unit 104. The back end 120 generates a target-dependent assembly code, and performs register allocation in process for the processing unit 104. The back end 120 also apportions utilization of the hardware of the computing device 100 for the adjusted IR (or the IR) to generate a specific order of assembly instructions. Such apportionments include, but are not limited to determining how to keep parallel execution units busy by filling delay slots.

During the apportionment of hardware resources for the generation of the assembly instructions, the back end 120 executes a loop transformation on the adjusted IR. The loop transformation can include loop unrolling that attempts to improve execution time of the adjusted IR. The loop transformation can be based on the soft break identifier of the source code 112 (included in some form in the adjusted IR). Moreover, the soft break indicator (specified in the adjusted IR (or the IR)) instructs the back end 120 that in-flight iterations of the associated loop are permitted to complete after execution of a break function. Moreover, as noted, the compiler 114 supports software pipelining. Thus, in at least one example, through the loop transformation based on the soft-break indicator and the software pipelining, the back end 120 specifies an out-of-order execution of instructions.

As a simplified example, during a loop transformation of the example source code 150 illustrated in FIG. 3 and/or the example source code 160 illustrated in FIG. 4, the back end 120 generates an assembly code corresponding to an order of operations for the disclosed for-loops, as identified in Table 1.

TABLE 1

...
// TimeSlice - T3
A(corners_in[12])
B(corners_in[11])
C(corners_in[10])
// TimeSlice - T4
A(corners_in[13])
B(corners_in[12])
C(corners_in[11])
SOFT-BREAK \\ corners_in[10]
// TimeSlice - T5
B(corners_in[13])
C(corners_in[12])
D(corners_in[11])
// TimeSlice - T6
C(corners_in[13])
D(corners_in[12])
E(corners_in[11])
// TimeSlice - T7
D(corners_in[13])
E(corners_in[12])
// TimeSlice - T8
E(corners_in[13])
...

In the example demonstrated in Table 1, it is presumed that after execution of the function C(corners_in[10]), the soft-break of the for-loop for iteration corners_in[10] is encountered (although C(corners_in[11]], B(corners_in[12] and A(corners_in[13]) is executed prior to the soft-break due to software pipelining). For purposes of simplification of explanation, it is presumed that operations for the loop illustrated in the source code 150 and the source code 160 following the soft-break for iteration corners_in[10] are non-mandatory, and do not affect later executing operations. However, iterations of the for-loop for corners_in[11] and corners_in[12] are already in-flight, as evidence by the operations C(corners_in[11]), B(corners_in[12]) and A(corners_in[13]). In response to the soft-break, these iterations are allowed to complete, as evidenced by B(corners_in[13]) . . . E(corners_in[13]) in times slices T5-T8 in Table 1.

As way of further explanation, Table 2 identifies an example of operations executed during time slices for the example source code 150 illustrated in FIG. 3 and/or the example source code 160 illustrated in FIG. 4. The operations are software pipelined, such that some operations occur in the same time slice (concurrent operations).

TABLE 2

| TIME SLICE | ITERATION | | | |
|---|---|---|---|---|
| | corners_in[10] | corners_in[11] | corners_in[12] | corners_in[13] |
| T1 | A(corners_in[10]) | | | |
| T2 | B(corners_in[10]) | A(corners_in[11]) | | |
| T3 | C(corners_in[10]) | B(corners_in[11]) | A(corners_in[12]) | |
| T4 | SOFTBREAK | C(corners_in[11]) | B(corners_in[12]) | A(corners_in[13]) |
| T5 | | D(corners_in[11]) | C(corners_in[12]) | B(corners_in[13]) |
| T6 | | E(corners_in[11]) | D(corners_in[12]) | C(corners_in[13]) |
| T7 | | | E(corners_in[12]) | D(corners_in[13]) |
| T8 | | | | E(corners_in[13]) |

As demonstrated in Table 2, at time slice T1, one (1) iteration, namely corners_in[10] is in-flight. In time slice T2, as evidenced by the operations B(corners_in[10]) and A(corners_in[11]), two (2) iterations, namely, corners_in[10] and corners_in[11]) are in-flight. Further, during time slice T3 three concurrent operations, C(corners_in[10]), B(corners_in[11]) and A(corners[12]) are executed. Thus, during time slice T3, three (3) iterations are in-flight. Additionally, in time slice T4, the soft-break is executed, which causes termination of the iteration corners_in[10]). However, due to the soft-break since the iterations corners_in[11], corners_in [12], and corners_in[13] are already in-flight, the back end 120 allows these iterations to complete in time slices T5-T8. That is, the soft-break enables the back end 120 to execute operations for iterations already in-flight, even after execution of the soft-break. Due to the concurrent operations in time slices, in many instances, the lost processing time of executing (possibly non-mandatory) functions such as the operations for the iterations corners_in[11], corners_in[12] and corners_in[13] is offset from the increased efficiency achieved by software pipelining that executes multiple operations concurrently.

The back end 120 outputs the compiled code 122 that includes assembly code (machine executable instructions) implementing object code. In at least on example, the compiled code 122 is a fully executable application. In at least one other example, the compiled code 122 is code that is utilizable by another application. The employment of the soft-break indicator allows for efficient apportionment of computer resources for software pipelining. In particular, if a loop included a "hard" break (and not the soft-break) the compiler 114 would be confined to an order of operations that permits a single iteration to be in-inflight at a given time to avoid undesired/unintentional execution of particular functions. Thus, by employment of the soft-break, better utilization of computer resources can be achieved, thereby resulting in faster execution of the compiled code 122. Accordingly, the compiler 114 improves the performance of a computing device executing the compiled code (including, but not limited to the computing device 100).

In view of the foregoing structural and functional features described above, an example method will be better appreciated with reference to FIG. 5. While, for purposes of simplicity of explanation, the example method of FIG. 5 is shown and described as executing serially, it is to be understood and appreciated, unless otherwise noted, that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a flowchart of an example method 200 for compiling source code. In at least one example, the method 200 is executed by a compiler (e.g., the compiler 114) executing on a computing device (e.g., the computing device 100). At 210, the compiler receives the source code. In at least one example, the source code represents a high level computer language, such as but not limited to C, C++, C sharp (C #), Objective-C, Swift, Java, JavaScript, Perl, Python or the like. The compiler is configured/programmed to support software pipelining.

At 220, the compiler parses the source code to determine a structure of the source code. At 230, the compiler detects a soft-break indicator in a body of a loop of the source code. In at least one example, the loop is a while-loop. In at least one other example, the loop is a for-loop. In still another example, the loop is a do-while-loop. In each situation, the soft-break is a request for an early exit of the loop. However, since the compiler supports software pipelining, multiple iterations of the code may be executed concurrently.

In at least one example, the soft-break indicator is a compiler directive, such as a compiler hint. In at least one other example, the soft-break is an intrinsic function of the compiler. At 240, the compiler compiles the source code to generate compiled code formed of machine executable instructions (e.g., assembly code instructions). In at least one example, the compiler employs software pipelining on the loop. In this manner, a set (or subset) of machine executable instructions in the compiled code that corresponds to the loop in the source code includes instructions for executing at least one in-flight iteration of the loop after exiting the loop.

By employment of the method 200, the compiler may apply software pipelining to a loop with a break (an early exit), namely a soft break. In this manner, computer resources of a computing device that executes the resultant machine executable instructions are apportioned more efficiently than a program with a hard-break (a non-soft-break) that prevents software pipelining in at least some situations.

In this description, the term "based on" means based at least in part on. Modifications are possible in the described embodiments, and other embodiments are possible, within the scope of the claims.

What is claimed is:

1. A non-transitory machine-readable medium comprising:
   a compiler configured to:
      detect a soft-break indicator in a loop included in source code; and apply software pipelining to generate compiled code for the loop,
      wherein the compiled code comprises assembly instructions and the soft-break indicator enables the compiler to arrange the assembly instructions so that execution of the soft-break indicator in an iteration of the loop does not prevent completion of one or more other in-flight iterations of the loop.

2. The medium of claim 1, wherein the soft-break indicator is an intrinsic function of the compiler that increases a permitted amount of overlap between successive iterations of the loop.

3. The medium of claim 1, wherein the soft-break indicator comprises a compiler hint and a break command, wherein the compiler hint increases a permitted amount of overlap between successive iterations of the loop.

4. The medium of claim 1, wherein the loop is one of a while-loop, a for-loop and a do-while-loop.

5. The medium of claim 1, wherein the compiled code is an executable software application.

6. The medium of claim 1, wherein the compiled code is object code stored in a library file.

7. The medium of claim 1, wherein the assembly instructions are executable by at least one of an x86 processor, an ARM processor and a digital signal processor (DSP).

8. A system comprising:
a non-transitory machine-readable memory that stores machine-readable instructions; and
a processing unit comprising one or more processor cores that access the memory and execute the machine-readable instructions, the machine-readable instructions comprising:
a compiler comprising:
a front end that receives source code comprising a loop with an embedded soft-break indicator that enables the compiler to arrange the assembly instructions to continue to complete one or more other in-flight iterations of the loop after execution of the embedded soft-break indicator in a given iteration of the loop, the front end generating an intermediate representation (IR) of the source code that includes the soft-break indicator; and
a back end that generates machine executable instructions based on the IR, wherein a subset of the machine executable instructions corresponding to the loop implements software pipelining.

9. The system of claim 8, wherein the software pipelining enables execution of at least one in-flight iteration of the loop after execution of a break in the loop.

10. The system of claim 8, wherein the software pipelining causes execution of multiple iterations of the loop concurrently.

11. The system of claim 8, wherein the loop comprises one of a for-loop, a while-loop and do-while-loop.

12. The system of claim 8, wherein the soft-break indictor is an intrinsic function of the compiler.

13. The system of claim 8, wherein the soft-break indicator comprises a compiler hint and a break command.

14. The system of claim 8, wherein the back end of the compiler applies loop transformation to the loop to apply the software pipelining.

15. The system of claim 8, wherein the machine executable instructions form an executable software application.

16. The system of claim 8, wherein the machine executable instructions form object code stored in a library file.

17. The system of claim 8, wherein the source code is text comprising human readable instructions.

18. A method comprising:
receiving source code with a loop that has a soft-break indicator in a body of the loop;
detecting the soft-break indicator; and
compiling the source code to form compiled code, wherein a set of machine executable instructions in the compiled code that corresponds to the loop includes instructions for continuing to execute one or more other in-flight iterations of the loop after execution of the soft-break indicator in a given iteration of the loop.

19. The method of claim 18, wherein the loop is one of a for-loop, a while-loop and a do-while-loop.

20. The method of claim 18, wherein the set of machine executable instructions in the compiled code that corresponds to the loop are arranged to apply software pipelining.

* * * * *